United States Patent
Tsuchiyama

(10) Patent No.: US 7,123,946 B2
(45) Date of Patent: Oct. 17, 2006

(54) PORTABLE INFORMATION TERMINAL DEVICE AND TELEPHONE DIRECTORY DISPLAY METHOD USED BY THE DEVICE

(75) Inventor: Kinya Tsuchiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 10/804,173

(22) Filed: Mar. 19, 2004

(65) Prior Publication Data

US 2004/0242282 A1 Dec. 2, 2004

(30) Foreign Application Priority Data

Mar. 20, 2003 (JP) .............................. 2003-077823

(51) Int. Cl.
*H04M 11/00* (2006.01)
*H04M 1/00* (2006.01)
*H04B 1/38* (2006.01)

(52) U.S. Cl. ...................... 455/566; 455/418; 455/565; 455/550; 455/424; 455/407; 455/414; 379/88.11; 379/93.23; 379/355; 379/354; 379/457

(58) Field of Classification Search ................ 455/566, 455/418, 424, 550.1, 565, 414, 407, 556.2; 379/88.11, 354, 355, 457, 93.23

See application file for complete search history.

(56) References Cited

U.S. PATENT DOCUMENTS 6,668,177 B1 * 12/2003 Salmimaa et al. .......... 455/566
6,704,398 B1   3/2004 Tsuchiyama

FOREIGN PATENT DOCUMENTS

| CN | 1348260 | 5/2001 |
|---|---|---|
| JP | 2000-358094 A | 12/2000 |
| JP | 2002-125036 A | 4/2002 |
| JP | 2002-300263 A | 10/2002 |
| JP | 2002-354105 A | 12/2002 |

* cited by examiner

*Primary Examiner*—Nick Corsaro
*Assistant Examiner*—Emem Ekong
(74) *Attorney, Agent, or Firm*—Foley & Larnder

(57) ABSTRACT

A display order deciding unit decides the display order upon displaying a telephone directory on the basis of setting if the telephone directory is displayed in the display order in response to a usage frequency or in the alphabetical order by a learning function setting unit, the information about the number of callings stored in a count storing unit, setting of the display mode of the telephone directory (by a day of the week) by a display mode selecting unit, and the information of a day of the week that is recognized by a day recognizing unit, and manages it in a display order managing unit. Upon displaying the telephone directory, an information display unit displays the information that is managed by the display order managing unit.

16 Claims, 8 Drawing Sheets

IS LEARNING FUNCTION SET ?

YES    NO

MODE SETTING SCREEN

FIG. 4A

<SETTING SCREEN>

1:BY DAY
2:BY WEEKDAY/HOLIDAY
3:BY MONTH

DAY SETTING SCREEN

FIG. 4B

```
      <DAY SETTING >

MONDAY:ON/OFF
      TUESDAY:ON/OFF

⋮

SUNDAY:ON/OFF
           OK
```

DAY SETTING SCREEN

FIG. 6

< GROUP SETTING SCREEN>

· GROUP1
· GROUP2
· GROUP3

MODE SETTING SCREEN

FIG. 8A

< GROUP 1>

DAY SETTING SCREEN
☐ MONDAY
⋮
☐ SUNDAY

DAY SETTING SCREEN

FIG. 8B

PORTABLE INFORMATION TERMINAL DEVICE AND TELEPHONE DIRECTORY DISPLAY METHOD USED BY THE DEVICE

The present application claims priority to prior Japanese application JP 2003-77823, the disclosure of which is incorporated herein by reference.

BACKGROUND OF THE INVENTION (1) Field of the Invention

The present invention relates to a portable information terminal device such as a portable telephone, a PDA (Personal Digital Assistant) or the like and a telephone directory display method used by the device.

(2) Description of the Related Art

Conventionally, in a portable information terminal such as a portable telephone terminal or the like, the telephone directory is displayed in the alphabetical order, in the memory number order, in the dial order, and in the order in response to a usage frequency of the telecommunication (the number of calling and the number of called).

In recent years, a capacity of a storage device provided to the above-described portable information terminal has been increased, and some amounts of the information can be held in a telephone directory for accumulating a telephone number of a candidate of the party of the telecommunication and the other information. Thus, since the information held in the telephone directory becomes huge, when a user wants to display the information with respect to a specific party of the telecommunication in accordance to needs, there is a problem such that the handling operation for displaying the target information becomes complicated. In order to solve such a problem, various propositions are made.

In a technology that has been already proposed, simplification of a retrieving procedure is intended by automatically rearranging telephone numbers in an electronic telephone directory depending on a set condition of the electronic telephone directory such as a day of the week and a period of time when calling up the electronic telephone directory so as to call up the electronic telephone directory in the order of priorities along the user's desires (JP-A-2000-358094).

In addition, it is also proposed that, arranging the information held in the electronic telephone directory according to a mode that has been registered in advance, the arranged information is displayed in a set mode (JP-A-2002-125036).

Further, a portable information terminal device capable of setting a priority of the address information display in units of a day of the week is also proposed (JP-A-2002-300263).

Further, it is proposed that the electronic telephone directory recognizes the clock information by itself and in accordance to all of the year, the month, the day, the day of the week, the hour, and the minute, or any combination thereof, the data of the electronic telephone directory can be rearranged (JP-A-2002-354105).

However, if details are set and the information can be arranged in order to immediately display the information that accords with the desire of a user (an operator) as much as possible, this results in the complicated handling of a preparatory stage for this. On the other hand, if this operation is drastically simplified, the user should scroll a display screen in many times till the desired information is displayed. Therefore, according to the prior art, there are some difficulties to secure appropriate convenience.

SUMMARY OF THE INVENTION

Therefore, an object of the present invention is to provide a portable information terminal device of the type described above, in which the target information can be retrieved immediately although the operation of a preparatory stage for displaying the desired information is simple, and a telephone display method used by the device.

In order to solve the above-described problem, the present invention provides:

(1) A portable information terminal device comprising a wireless telecommunication unit for engaging the wireless telecommunication with an outer apparatus; a central processing unit for carrying out the processing of deciding a priority for displaying a candidate of the party of the telecommunication on the basis of a history of the telecommunication to be carried out through the wireless telecommunication unit and the setting operation by an operator; a display unit for making the operator to recognize the processing at the central processing unit; a key board for making the central processing unit to accept the operation by the operator; and a display order managing unit for managing the display of the information in corroboration with the central processing unit; wherein the central processing unit comprises a learning function setting means for making the operator to set a calculation mode of a priority for performing the display in response to a history of the telecommunication; a count storing means for counting a frequency of the telecommunication; a display mode selecting means for selectively setting a display mode at the display unit; and a day recognizing means for recognizing the day corresponding to the telecommunication in response to the history of the telecommunication; and wherein the portable information terminal device decides the display order at the display unit on the basis of setting condition of the learning function setting means, the stored information in the count storing means, setting by the display mode selecting means, and the information of a day of the week that is recognized by the day recognizing means; and manages the display order in the display order managing unit.

(2) The portable information terminal device according to (1), wherein the central processing unit further comprises an information display means for controlling the display at the display unit; and the information display means makes the display unit to display the telephone directory as the display about a candidate of the party of the telecommunication on the basis of the information that is managed by the display order managing unit.

(3) The portable information terminal device according to (1), wherein the central processing unit further comprises a destination identifying means for identifying the transmission destination of the telecommunication to be engaged through the wireless telecommunication unit; and a originating call counting means for counting a frequency of the callings for each transmission destination that is identified by the destination identifying means; and the count storing means holds the frequency of the callings to be counted by the originating call counting means.

(4) The portable information terminal device according to (1), wherein the learning function setting means selectively sets if the telephone directory as the display about the candidate of the party of the telecommunication is displayed in the display order in response to a usage frequency or in the alphabetical order.

(5) The portable information terminal device according to (1), wherein the display mode selecting means selects a day of the week about the display order in the telephone directory as the display about the candidate of the party of the telecommunication.

(6) The portable information terminal device according to (1), wherein the display mode selecting means selects segments of weekdays and holidays about the display order in the telephone directory as the display about the candidate of the party of the telecommunication.

(7) The portable information terminal device according to (1), wherein the display mode selecting means selects the segments of the beginning, the middle, and the end of the corresponding month about the display order in the telephone directory as the display about the candidate of the party of the telecommunication.

(8) The portable information terminal device according to (1), wherein the display mode selecting means selects if the display mode selecting means selectively sets the display mode or not.

(9) A telephone directory displaying method for displaying the telephone directory as the display about the candidate of the party of the telecommunication in a portable information terminal device, the portable information terminal device comprising a wireless telecommunication unit for engaging the wireless telecommunication with an outer apparatus; a central processing unit for carrying out the processing of deciding a priority for displaying a candidate of the party of the telecommunication on transmission on the basis of a history of the telecommunication to be carried out through the wireless telecommunication unit and the setting operation by an operator; a display unit for making the operator to recognize the processing at the central processing unit; an key board for making the central processing unit to accept the operation by the operator; and a display order managing unit for managing the display of the information in corroboration with the central processing unit; wherein the telephone directory displaying method includes steps of deciding the display order at the display unit and managing the display order in the display order managing unit on the basis of a learning function setting information showing the setting by the operator to set a calculation mode of a priority for performing the display in response to a history of the telecommunication, a count storing information showing counter value of a number of telecommunication, a display mode selecting information showing the selective setting a display mode at the display unit, and a recognition information of a day of the week showing the day corresponding to the telecommunication in response to the history of the telecommunication.

(10) The telephone directory displaying method in the portable information terminal device according to (9), wherein the telephone directory displaying method makes the display unit to display the telephone directory as the display about the candidate of the party of the telecommunication on the basis of the information that is managed by the display order managing unit.

(11) The telephone directory displaying method in the portable information terminal device according to (9), wherein the telephone directory displaying method acquires the transmission destination identifying information for identifying the transmission destination of the telecommunication to be engaged through the wireless telecommunication unit; and the calling counting information for counting a frequency of the callings of the telecommunication for each transmission destination that is identified by the transmission destination identifying information; and the information storing the frequency of the telecommunication to be counted by the transmission counting information therein is made into the count storing information.

(12) The telephone directory displaying method in the portable information terminal device according to (9), wherein the learning function setting information serves to represent if the telephone directory as the display about the candidate of the party of the telecommunication is displayed in the display order in response to a usage frequency or in the alphabetical order.

(13) The telephone directory displaying method in the portable information terminal device according to (9), wherein the display mode selecting information selects a day of the week about the display order in the telephone directory as the display about the candidate of the party of the telecommunication.

(14) The telephone directory displaying method in the portable information terminal device according to (9), wherein the display mode selecting information selects segments of weekdays and holidays about the display order in the telephone directory as the display about the candidate of the party of the telecommunication as the display about the candidate of the party of the telecommunication.

(15) The telephone directory displaying method in the portable information terminal device according to (9), wherein the display mode selecting information selects the segments of the beginning, the middle, and the end of the corresponding month about the display order in the telephone directory as the display about the candidate of the party of the telecommunication.

(16) The telephone directory displaying method in the portable information terminal device according to (9), wherein the display mode selecting information includes to selectively set the display mode or not.

BRIEF DESCRIPTION OF THE DRAWINGS

FIG. 4A is a view showing a display example as a mode setting screen at a display unit in the device shown in FIG. 1;

FIG. 4B is a view showing a display example as a day setting screen at a display unit in the device shown in FIG. 1;

FIG. 6 is a view showing a display condition as a day setting screen according to the operation example in the flow chart shown in FIG. 5;

FIG. 8A is a view showing a display condition as a mode setting screen according to the operation example in the flow chart shown in FIG. 7; and FIG. 8B is a view showing a display condition as a day setting screen according to the operation example in the flowchart shown in FIG. 7.

DESCRIPTION OF THE PREFERRED EMBODIMENTS

The preferred embodiments of a portable information terminal device and a telephone directory display method used by the device according to the present invention will be described in detail below.

Figure 1:
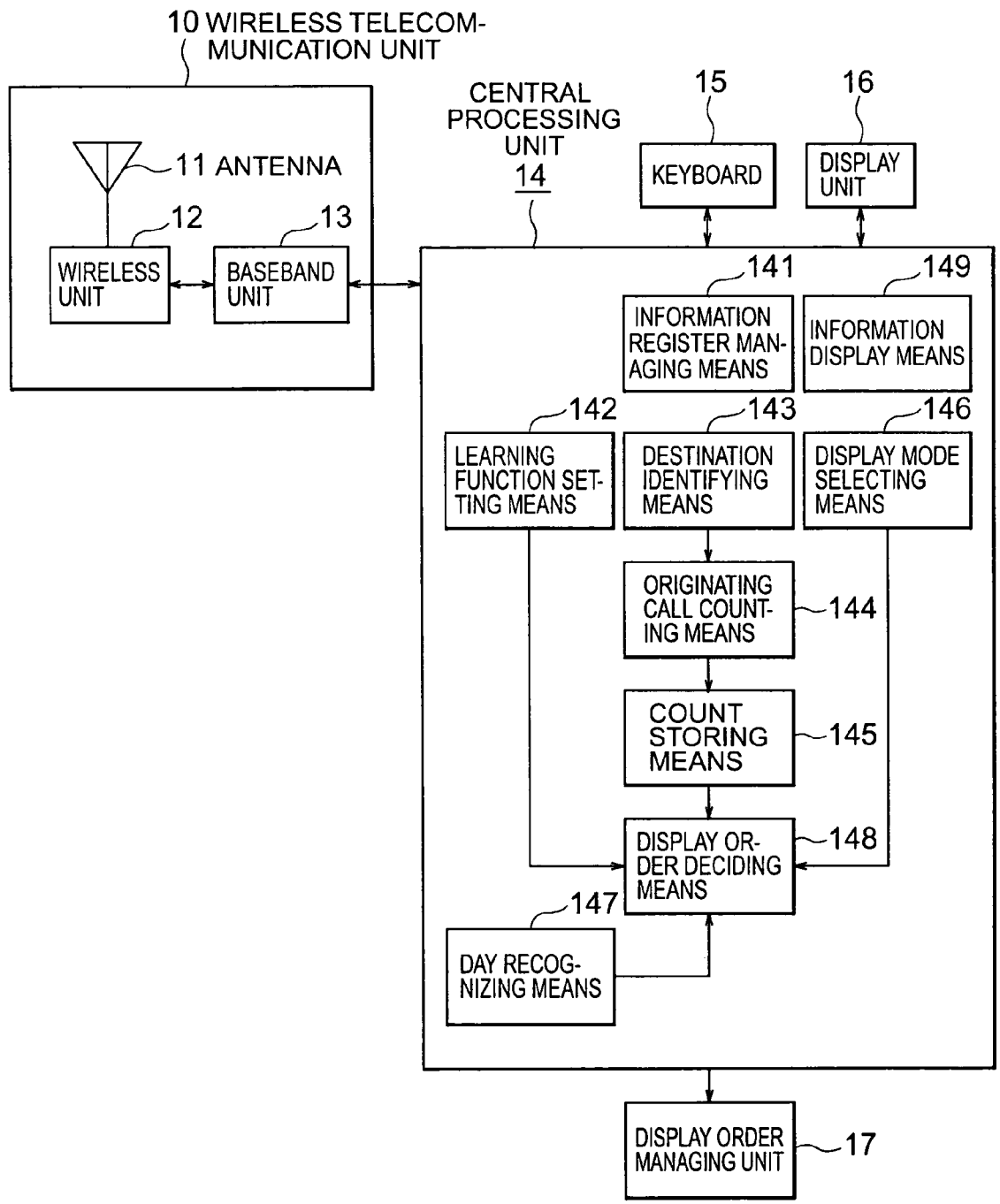
FIG. 1 is a block diagram showing an embodiment according to the present invention.

FIG. 1 is a block diagram showing an embodiment according to the present invention.

In FIG. 1, a wireless telecommunication unit 10 for engaging the wireless telecommunication with an outer apparatus includes an antenna 11, a wireless unit 12, and a baseband unit 13. The antenna 11 is used for transmitting and receiving an origination/destination number to and from a base station. The wireless unit 12 is used for transmitting and receiving a wireless signal. And the baseband unit 13 is used for coding the data to be transmitted and received by the wireless unit 12 and decoding the coded data.

A central processing unit 14 is further provided for controlling all of the operations of the device and carrying out the processing of prescribed information to the device. This central processing unit 14 carries out the processing of deciding a priority for displaying a candidate of the party of the telecommunication on the basis of a history of the telecommunication to be carried out through the above-described wireless telecommunication unit 10 and the setting handling by the operator. The telecommunication includes both of an originating and a terminating calls therein.

The central processing unit 14 is connected so as to cooperate with a key board 15, a display unit 16, and a display order managing unit 17. The key board 15 is used for selecting the display of a telephone directory and inputting data or the like, making the central processing unit 14 to accept the operation or handling by the operator. The display unit 16 is used for displaying the information such as the received mails and the telephone directory or the like, making the operator to recognize the processing at the central processing unit 14. The display order managing unit 17 is used for managing the order to display the telephone numbers in corroboration with the central processing unit 14 upon displaying the telephone directory.

In addition, the central processing unit 14 is provided with an information register managing means 141, a learning function setting means 142, a destination identifying means 143, an originating call counting means 144, a count storing means 145, a display mode selecting means 146, a day recognizing means 147 for recognizing a day of the week, a display order deciding means 148, and an information display means 149.

The information register managing means 141 receives the input of the key board 15 from the user, registers the information such as the telephone numbers and the names or the like in the telephone directory, and manages it. The learning function setting means 142 sets if the telephone directory is displayed in the display order in response to a usage frequency or in an alphabetical order. The destination identifying means 143 identifies a destination location of calling. And the originating call counting means 144, when the transmission destination is identified, adds "1" to the number of callings (frequency of calling per destination) and the added number is sent to a count storing means 145. Then the count storing means 145 stores the added number therein.

According to the present example, the count storing means 145 manages the number of count depending on a day of the week. Using the display mode selecting means 146, the user is capable of setting a display mode (by a day of the week) of the telephone directory.

The display order deciding means 148 decides the display order upon displaying the telephone directory on the basis of setting of the learning function setting means 142, the information of the count storing means 145, setting of the display mode selecting means 146, and the information of a day of the week that is recognized by the day recognizing means 147. And the display order deciding means 148 manages it in the display order managing unit 17. Upon displaying the telephone directory, the information display means 149 displays the information that is managed by the display order managing unit 17.

Figure 2:
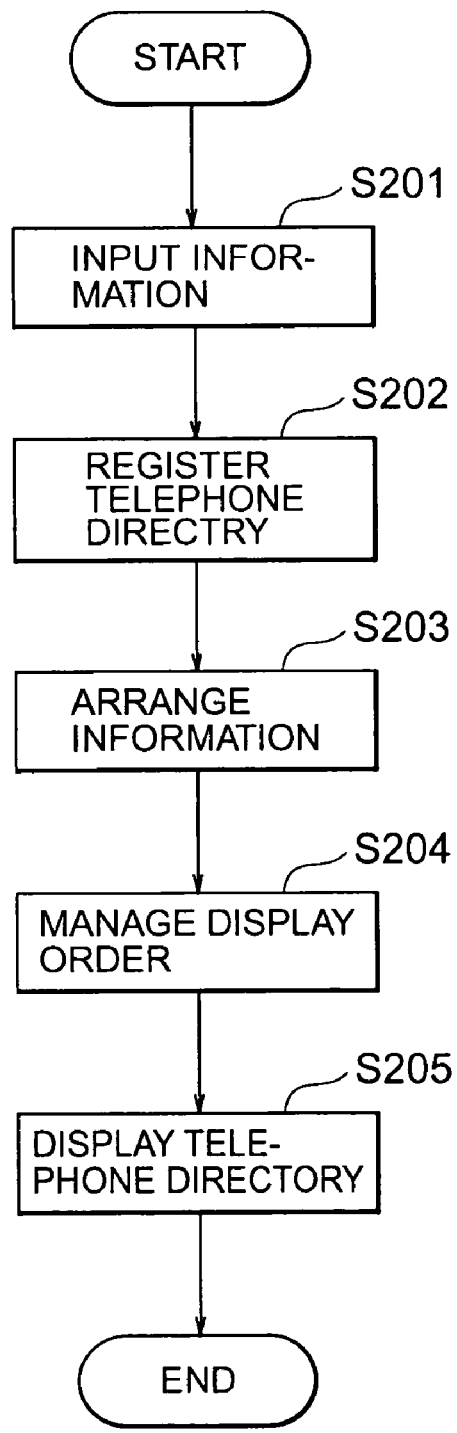
FIG. 2 is a flow chart for explaining the operation of a device shown in FIG. 1.

FIG. 2 is a flow chart for explaining the operation of a device shown in FIG. 1.

With reference to FIG. 2, a flow of the processing to the central processing unit 14 from recording of the information in the telephone directory till displaying of the registered information after setting the mode will be described below.

At first, the central processing unit 14 may input the information to be registered in the telephone directory (S201). When inputting of the information is completed and registration is selected, the inputted information is registered in the telephone directory to be managed by using the information register managing means 141 (S202). With respect to the registered information, the display order deciding means 148 may arrange the display order in accordance with the selected mode in advance (S203), and the display order managing unit 17 may manage it (S204). In the case of displaying the telephone directory, by using the information display means 149, the telephone directory is displayed on the display unit 16 (S205).

Figure 3:
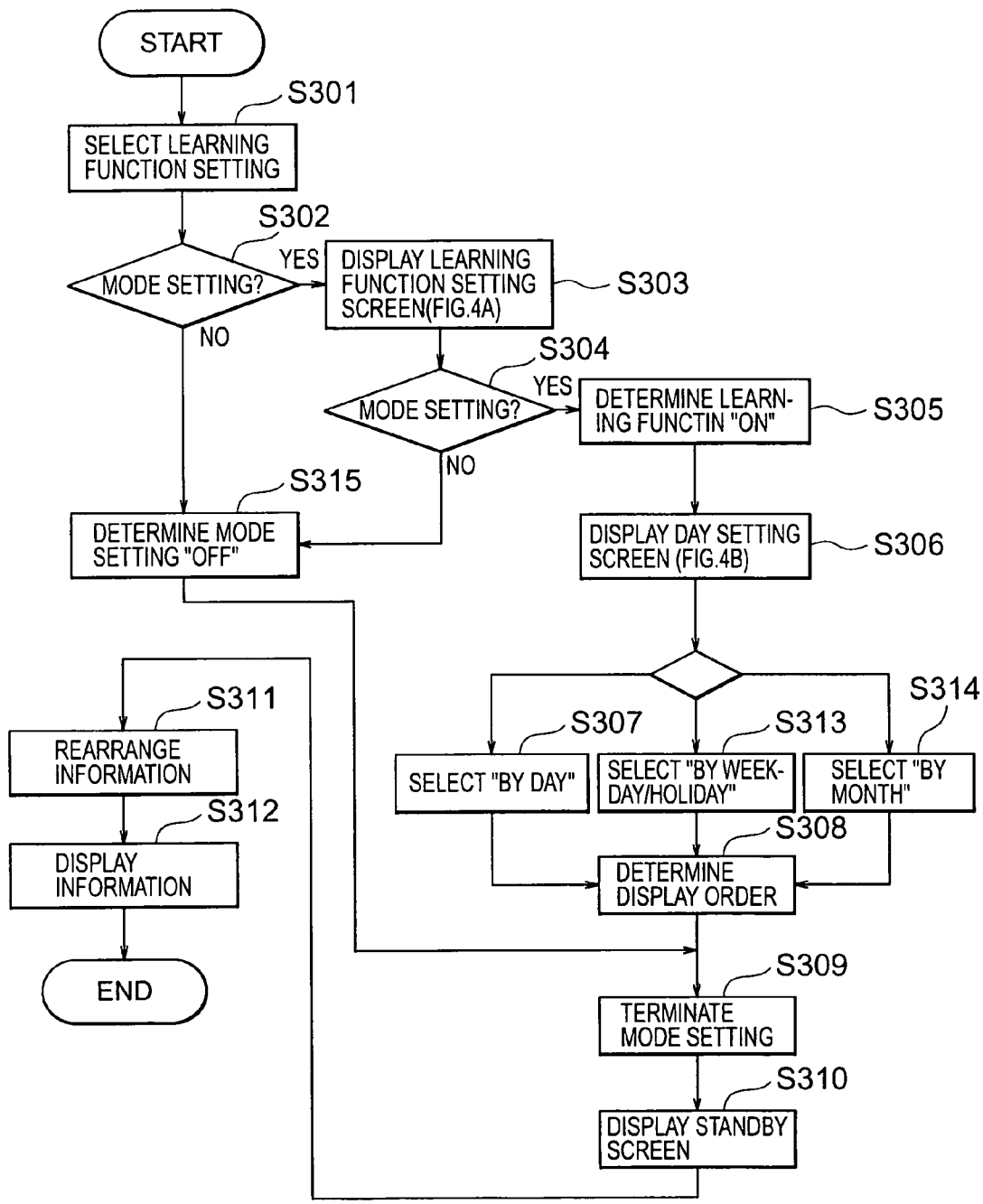
FIG. 3 is a flow chart for explaining setting of a mode in the device shown in FIG. 1.

Next, FIG. 3 is a flow chart for explaining setting of a mode in the device shown in FIG. 1.

In addition, FIG. 4A or 4B is a view showing display example as a mode setting screen or a day setting screen at the display unit in the device shown in FIG. 1.

On the basis of FIG. 3 and FIGS. 4A and 4B, a flow of setting of the learning function to count and manage the usage frequency and a flow of setting the display mode will be described below.

At first, the learning function setting is selected from a menu screen (S301). In the case of setting the learning function (Yes of S302), a learning function setting screen as shown in FIG. 4A is displayed (S303). If "ON" is selected (Yes of S304), a learning function ON is determined (S305), a day setting screen as shown in FIG. 4B is displayed (S306). If "by a day" is selected (S307), the calling from the user is managed by a day, the display order is determined by the usage frequency (S308), and the display mode setting is terminated (S309). When the mode setting is terminated, the screen may return to a normal standby screen (S310), the display order is rearranged (S311), and the information is displayed in the display order that is set upon displaying the telephone directory (S312).

In the same way, if "by a weekday/holiday" is selected (S313) from step S306, the step advances toward the step S308 mentioned above and the display order is determined depending on the usage frequency by the weekdays from Monday to Friday and the holidays such as Saturday or Sunday. If "by a month" is selected (S314) from step S306, the step advances toward the step S308. And the display order is determined by the usage frequency of the segments of the beginning, the middle, and the end of the corresponding month, namely, the beginning of the month (the first to the tenth), the middle of the month (the eleventh to the twentieth), and the end of the month (from twenty-first to the thirtieth) (the segments of the beginning, the middle, and the end of the corresponding month). And then the step advances toward the step S309 and the display mode setting is terminated.

When the display mode setting is not performed (No of S302, or No of S304), the display mode setting OFF is determined (S315), and then, the step advances toward the step S309 mentioned above and the display mode setting is terminated.

Figure 5:
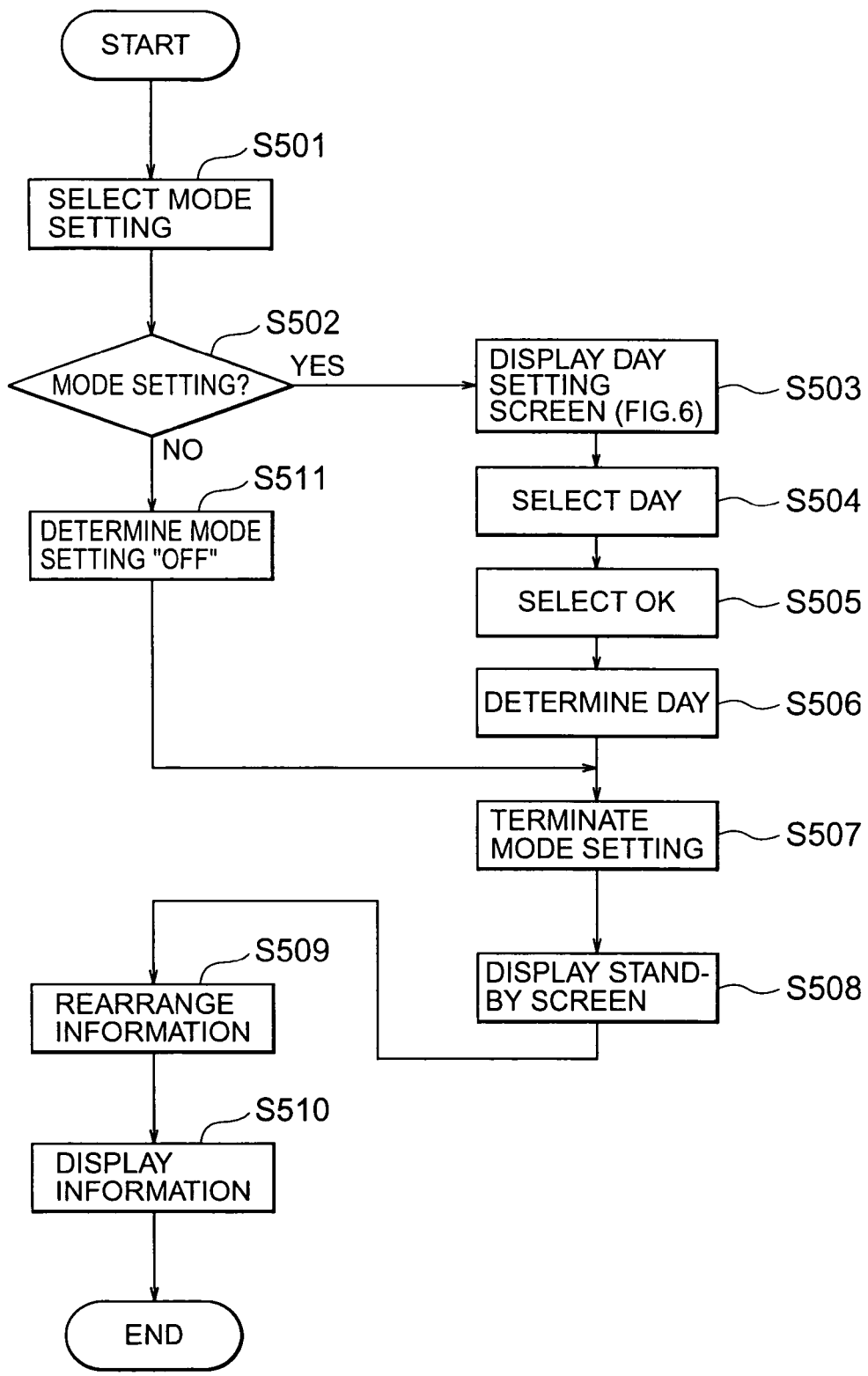
FIG. 5 is a flow chart for explaining a setting function of a day of the week according to an embodiment of the present invention.

FIG. 5 is a flow chart for explaining a setting function of a day of the week according to an embodiment of the present invention.

In addition, FIG. 6 is a view showing a display condition according to the operation example as day setting screen in the flow chart shown in FIG. 5.

On the basis of FIG. 5 and FIG. 6, a flow of the display mode setting when the user can arbitrarily set the day will be described below.

At first, the display mode setting is selected from the menu screen (S501). When setting the display mode (Yes of S502), a day setting screen as shown in FIG. 6 is displayed (S503). Selecting the day to be set (a plurality of days is available) (S504) and selecting OK (S505), the display mode is determined (S506) and the display mode setting is terminated (S507).

When the display mode setting is terminated, the screen returns to the normal standby screen (S508), and the display order is rearranged (S509), and the information is displayed in the display order that is set upon displaying the telephone directory (S510).

When the display mode is not set (No of S502), the display mode setting OFF is determined (S511), and the step advances toward the step S507 mentioned above and the display mode setting is terminated.

Figure 7:
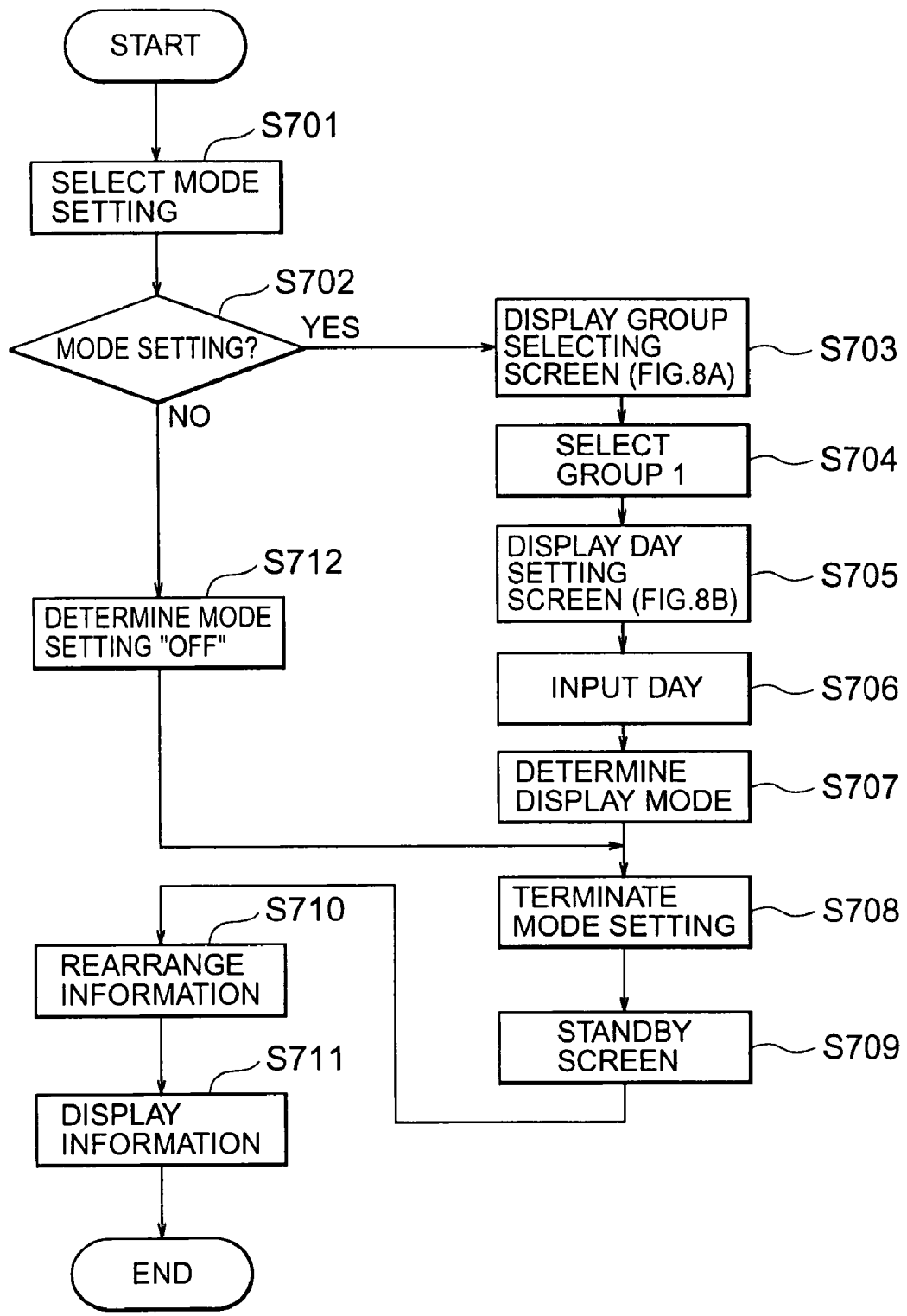
FIG. 7 is a flow chart for explaining a function to set a day of the week by grouping according to the other embodiment of the present invention.

FIG. 7 is a flow chart for explaining a function to set a day of the week by grouping according to the other embodiment of the present invention.

In addition, FIG. 8A or 8B is a view showing display example as a mode setting screen or a day setting screen at the display unit in the device shown in FIG. 7.

On the basis of FIG. 7 and FIGS. 8A and 8B, a flow of the display mode setting when the user can arbitrarily group the days and set them will be described below.

At first, the display mode setting is selected from the menu screen (S701). When setting the display mode (Yes of S702), a group selecting screen as shown in FIG. 8A is displayed (S703). If "a group 1" is selected (S704), a day setting screen as shown in FIG. 8B is displayed (S705). If the day to be set (a plurality of days is available) is inputted in the group 1 (S706), the display mode of the inputted group 1 is determined (S707) and the display mode setting is terminated (S708).

When the display mode setting is terminated, the screen returns to the normal standby screen (S709), the display order is rearranged (S710), and the information is displayed in the display order that is set upon displaying the telephone directory (S711).

When the display mode is not set (No of S702), display mode setting OFF is determined (S712), and the step advances toward the step S708 mentioned above and the display mode setting is terminated.

According to the present invention, this kind of a portable information terminal device, in which the target information can be retrieved immediately although the operation of a preparatory stage for displaying the desired information is simple, and a telephone display method by this device are realized.

What is claimed is:

1. A portable information terminal device comprising:
   a wireless telecommunication unit for engaging the wireless telecommunication with an outer apparatus;
   a central processing unit for carrying out the processing of deciding a priority for displaying a candidate of the party of the telecommunication on the basis of a history of the telecommunication to be carried out through said wireless telecommunication unit and the setting operation by an operator;
   a display unit for making said operator to recognize the processing at said central processing unit;
   a key board for making said central processing unit to accept the operation by said operator; and
   a display order managing unit for managing said display of the information in corroboration with said central processing unit;
   wherein said central processing unit comprises a learning function setting means for making said operator to set a calculation mode of a priority for performing said display in response to a history of the telecommunication; a count storing means for counting a frequency of the telecommunication; a display mode selecting means for selectively setting a display mode at said display unit; and a day recognizing means for recognizing the day corresponding to the telecommunication in response to the history of the telecommunication; and
   wherein said portable information terminal device decides the display order at said display unit on the basis of setting condition of said learning function setting means, the stored information in said count storing means, setting by said display mode selecting means, and the information of a day of the week that is recognized by said day recognizing means; and manages said display order in said display order managing unit.

2. A portable information terminal device according to claim 1,
   wherein said central processing unit further comprises an information display means for controlling the display at said display unit; and said information display means makes said display unit to display the telephone directory as the display about a candidate of the party of the telecommunication on the basis of the information that is managed by said display order managing unit.

3. A portable information terminal device according to claim 1,
   wherein said central processing unit further comprises a destination identifying means for identifying the transmission destination of the telecommunication to be engaged through said wireless telecommunication unit; and a originating call counting means for counting a frequency of the callings for each transmission destination that is identified by said destination identifying means; and said count storing means holds the frequency of the callings to be counted by said originating call counting means.

4. A portable information terminal device according to claim 1,
   wherein said learning function setting means selectively sets if the telephone directory as the display about said candidate of the party of the telecommunication is displayed in the display order in response to a usage frequency or in the alphabetical order.

5. A portable information terminal device according to claim 1, wherein said display mode selecting means selects a day of the week about the display order in the telephone directory as the display about said candidate of the party of the telecommunication.

6. A portable information terminal device according to claim 1,
wherein said display mode selecting means selects segments of weekdays and holidays about the display order in the telephone directory as the display about said candidate of the party of the telecommunication.

7. A portable information terminal device according to claim 1,
wherein said display mode selecting means selects the segments of the beginning, the middle, and the end of the corresponding month about the display order in the telephone directory as the display about said candidate of the party of the telecommunication.

8. A portable information terminal device according to claim 1,
wherein said display mode selecting means selects if said display mode selecting means selectively sets said display mode or not.

9. A telephone directory displaying method for displaying the telephone directory as the display about said candidate of the party of the telecommunication in a portable information terminal device, said portable information terminal device comprising:
a wireless telecommunication unit for engaging the wireless telecommunication with an outer apparatus;
a central processing unit for carrying out the processing of deciding a priority for displaying a candidate of the party of the telecommunication on transmission on the basis of a history of the telecommunication to be carried out through said wireless telecommunication unit and the setting operation by an operator;
a display unit for making said operator to recognize the processing at said central processing unit;
an key board for making said central processing unit to accept the operation by said operator; and
a display order managing unit for managing said display of the information in corroboration with said central processing unit;
wherein said telephone directory displaying method includes steps of deciding the display order at the display unit and managing the display order in the display order managing unit on the basis of a learning function setting information showing the setting by the operator to set a calculation mode of a priority for performing the display in response to a history of the telecommunication, a count storing information showing counter value of a number of telecommunication, a display mode selecting information showing the selective setting a display mode at the display unit, and a recognition information of a day of the week showing the day corresponding to the telecommunication in response to the history of the telecommunication.

10. A telephone directory displaying method in the portable information terminal device according to claim 9,
wherein said telephone directory displaying method makes said display unit to display the telephone directory as the display about said candidate of the party of the telecommunication on the basis of the information that is managed by said display order managing unit.

11. A telephone directory displaying method in the portable information terminal device according to claim 9,
wherein said telephone directory displaying method acquires the transmission destination identifying information for identifying the transmission destination of the telecommunication to be engaged through said wireless telecommunication unit; and the calling counting information for counting a frequency of the callings of the telecommunication for each transmission destination that is identified by said transmission destination identifying information; and the information storing the frequency of the telecommunication to be counted by said transmission counting information therein is made into the count storing information.

12. A telephone directory displaying method in the portable information terminal device according to claim 9,
wherein said learning function setting information serves to represent if the telephone directory as the display about said candidate of the party of the telecommunication is displayed in the display order in response to a usage frequency or in the alphabetical order.

13. A telephone directory displaying method in the portable information terminal device according to claim 9,
wherein said display mode selecting information selects a day of the week about the display order in the telephone directory as the display about said candidate of the party of the telecommunication.

14. A telephone directory displaying method in the portable information terminal device according to claim 9,
wherein said display mode selecting information selects segments of weekdays and holidays about the display order in the telephone directory as the display about said candidate of the party of the telecommunication.

15. A telephone directory displaying method in the portable information terminal device according to claim 9,
wherein said display mode selecting information selects the segments of the beginning, the middle, and the end of the corresponding month about the display order in the telephone directory as the display about said candidate of the party of the telecommunication.

16. A telephone directory displaying method in the portable information terminal device according to claim 9,
wherein said display mode selecting information includes to selectively set said display mode or not.

* * * * *